United States Patent [19]

Kapany

[11] 4,078,548
[45] Mar. 14, 1978

[54] HIGH EFFICIENCY SOLAR PANEL

[75] Inventor: Narinder S. Kapany, Woodside, Calif.

[73] Assignee: Kaptron, Inc., Palo Alto, Calif.

[21] Appl. No.: 653,784

[22] Filed: Jan. 30, 1976

Related U.S. Application Data

[62] Division of Ser. No. 462,857, Apr. 22, 1974, Pat. No. 3,985,116.

[51] Int. Cl.² .................................................. F24J 3/02
[52] U.S. Cl. ................................... 126/271; 350/96.10
[58] Field of Search ................. 126/270, 271; 136/206, 136/89; 350/96 R

[56] References Cited

U.S. PATENT DOCUMENTS

| 294,117 | 2/1884 | Calver | 126/271 |
|---|---|---|---|
| 2,506,951 | 5/1950 | Doane | 350/259 |
| 2,969,788 | 1/1961 | Newton | 126/271 |
| 3,089,670 | 5/1963 | Johnson | 126/270 |
| 3,229,682 | 1/1966 | Perlmutter et al. | 126/270 |
| 3,350,234 | 10/1967 | Ule | 126/270 |
| 3,427,200 | 2/1969 | Lapin et al. | 136/89 |
| 3,460,893 | 8/1969 | Wilks | 350/96 R |
| 3,780,722 | 12/1973 | Swet | 126/270 |
| 3,963,327 | 6/1976 | Poirier | 350/96 R |

FOREIGN PATENT DOCUMENTS

| 387,828 | 2/1933 | United Kingdom | 126/270 |

Primary Examiner—Carroll B. Dority, Jr.
Attorney, Agent, or Firm—Limbach, Limbach & Sutton

[57] ABSTRACT

A window portion is interposed between the incident light and a heat absorbing portion and at least one of the heat absorbing and window portions has a plurality of spaced apart reflecting surfaces, separate ones of which face each other and transmit the incident light by multiple reflections to the heat absorbing portion. In at least one embodiment, these opposed reflecting surfaces converge in the direction of light travel from the window portion to the heat absorbing portion and infrared reflecting means are interposed between the window portion and the heat absorbing portion to return infrared light emitted by the heat absorbing portion back to the heat absorbing portion.

5 Claims, 15 Drawing Figures

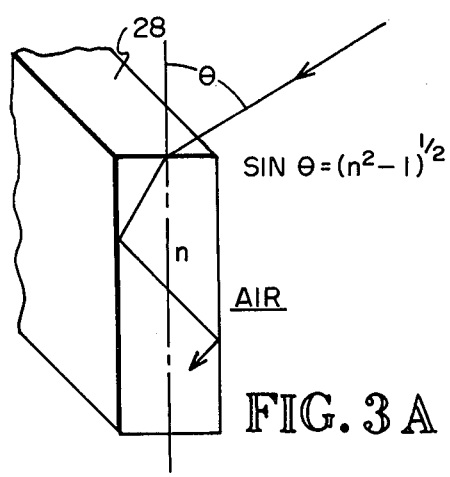
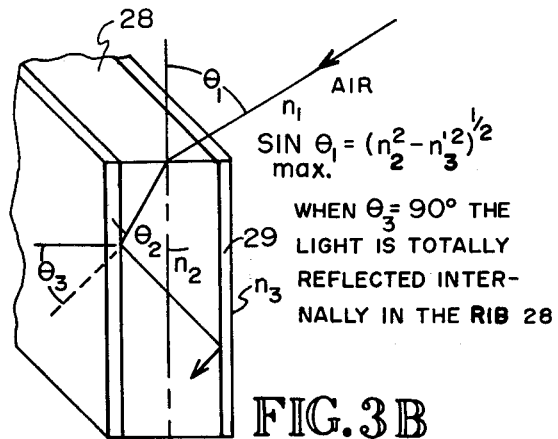
FIG. 3A
FIG. 3B
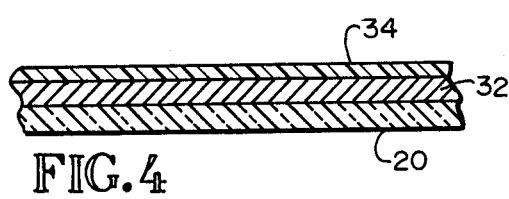
FIG. 4
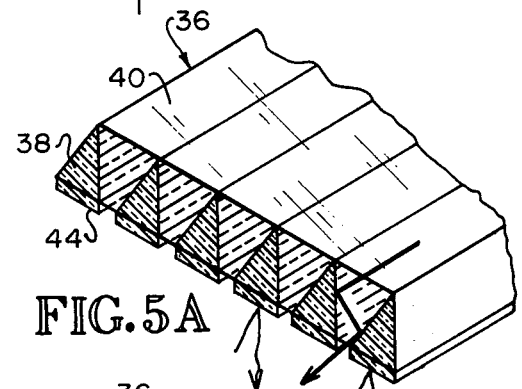
FIG. 5A
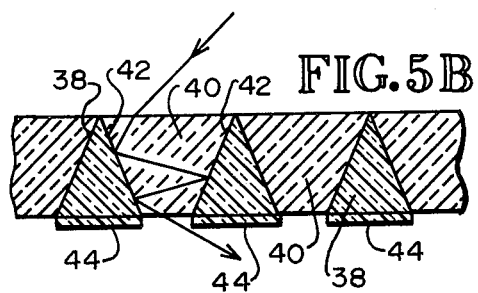
FIG. 5B
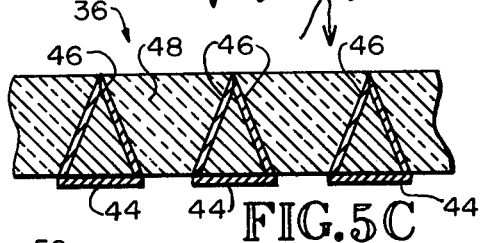
FIG. 5C
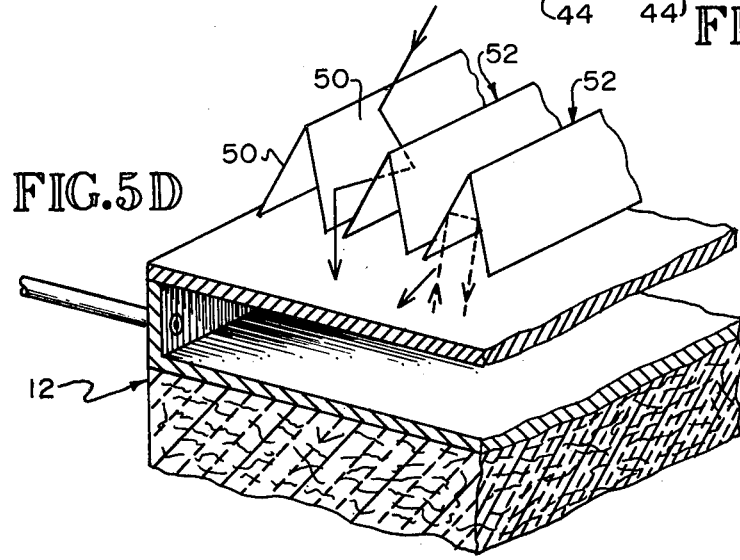
FIG. 5D $$\sin\theta_{max} = \frac{d_2}{d_1}$$

$$\sin\theta_{max} = \frac{d_2}{d_1}(n^2 - n'^2)^{1/2}$$

$$n > n'$$

HIGH EFFICIENCY SOLAR PANEL

CROSS-REFERENCE TO RELATED APPLICATION

The present application is a division of application Ser. No. 462,857 filed Apr. 22, 1974 and now U.S. Pat. No. 3,985,116, issued Oct. 12, 1976, for HIGH EFFICIENCY SOLAR PANEL and is related in part to the applicant's U.S. Pat. No. 3,936,157 and entitled HIGH EFFICIENCY LIGHT TRANSMITTING WINDOW PANEL.

BACKGROUND OF THE INVENTION

The invention relates to a solar panel and more particularly to a high efficiency solar panel for converting incident solar light into heat.

In some prior art types of solar panels, the incident light passes through a window to a heat absorber. The window is intended to transmit solar radiation while trapping the re-emitted infrared radiation from the absorber. The window also reduces convection losses using "hot house" and "window pane" techniques. The window sometimes consists of one or more layers of transparent glass or plastic separated by air. The absorber is designed to be heated by absorption of the energy incident from the sun and to transmit this heat to a heat transfer fluid, which is typically water or air. The absorber is insulated to minimize heat loss to the surroundings. Each of these components and more particularly the window and the absorber can be improved by the application of optical techniques.

The window portion should be highly transmitting to light having a wavelength in the 0.3 to 2 micron range. Also the transmission of the incident light should be independent of the angle of incidence or polarization, thus making the solar panel useful even on a cloudy day while avoiding the use of expensive mechanical tracking systems. Infrared re-radiation from the absorbing portion should be trapped within the panel. The window portion should be made of low cost materials without sacrificing sturdiness.

Some of these requirements are contradictory. For example, in order to make the window portion sturdy or in order to make it more effective in trapping infrared re-radiation, some prior art panels are made with relatively thick window portions which have lower light transmitting qualities than relatively thinner sections. Thus, the light transmitting capability is degraded to improve the capability to trap re-emitted infrared radiation. Furthermore, when the window portion is made relatively thick the acceptance angle properties of the window portion may be degraded in some prior art arrangements.

The ideal absorbing portion must have a high absorptivity for light wavelengths in the 0.3 to 2 micron range and a low emissivity for light wavelengths in approximately the 10 micron range. For a black body, the ratio of absorptivity to emissivity is approximately one whereas for a polished metal surface this ratio is approximately three. Ratios on the order of nine have been obtained by coating a thin absorption layer over a reflecting surface. The layer is thick enough to absorb solar radiation but thin compared to the wavelength of the infrared. In prior art devices of this type, however, such coatings tend to be difficult to apply and lose their high absorptivity to emissivity ratio with age. The disadvantages of a simple polished metal surface is that it is highly reflecting with a reflectivity constant of approximately 0.9. Further, design requirements for such absorbing portions are that they should give good contact with the fluid to be heated, be inexpensive to manufacture and should reduce convection losses.

SUMMARY OF THE INVENTION

The above described disadvantages of the prior art are overcome and the requirements for a high efficiency solar panel are met by the present invention of a solar panel for converting incident light into heat comprising a heat absorbing portion and a window portion interposed between the incident light and the heat absorbing portion with at least one of the heat absorbing and window portions having a plurality of opposed reflecting surfaces which transmit the incident light by multiple reflections to the heat absorbing portion. By "opposed reflecting surfaces" is meant that separate ones of the plurality of reflective surfaces are spaced apart from and face each other, either directly or obliquely, so that multiple reflections can occur.

In some preferred embodiments of the invention, the plurality of opposed reflecting surfaces converge in the overall direction of the light travel from the window portion to the heat absorbing portion. In one such embodiment, for example, the opposed reflecting surfaces are arranged in V-shaped, parallel grooves.

In some preferred embodiments means are also interposed between the reflecting surfaces and the heat absorbing portion to reflect infrared light emitted by the heat absorbing portion back to the heat absorbing portion. For example, as part of the window portion of one such embodiment, a plurality of parallel, triangularly shaped wedges are provided for supporting the opposed reflecting surfaces. Each wedge has one apex pointing away from the heat absorbing portion and supports a pair of reflecting surfaces which diverge from the one apex in the direction toward the heat absorbing portion. Thus, in effect, the reflecting surfaces facing each other which are supported by each pair of adjacent wedges converge in the direction of light travel to the absorbing portion. In this preferred embodiment the means for reflecting the infrared re-radiation comprises infrared reflecting surfaces which are disposed between the other two apexes of each wedge, that is, the infrared reflecting surfaces are arranged so as to face the heat absorbing portion and are supported adjacent to the flat surface of the bottom of each wedge. In other embodiments the opposed reflecting surfaces are on self-supporting substrates arranged in parallel V-groove fashion. Both the V-groove and wedge configurations preferably have their longitudinal axes aligned along the direction of solar travel over the panel, for reasons which will be explained in greater detail hereinafter. The infrared reflecting surfaces also may have a variety of shapes such as flat, inverted V-shaped grooves, or even concave, hemi-cylindrical grooves.

The window portion in other embodiments of the invention comprises a pair of thin transparent sheets which are separated by a plurality of ribs made of light transmitting material arranged to transmit the incident light striking the window within a predetermined angle of acceptance to the heat absorbing portion by means of multiple total internal reflections. In one embodiment, for example, the ribs take the form of a plurality of transparent columns while in other embodiments the ribs are in the form of transparent zig-zag walls or a honeycomb structure. In these embodiments the window portion preferably further includes means for segmenting air spaces between the sheets to reduce convection losses and to distribute better the mechanical load applied to the window. This form of construction has the advantages of light weight, sturdiness, high light transmission and low cost.

In these and other embodiments, the heat absorbing portion may include a top panel of reflective surfaces arranged in honeycomb fashion to receive the incident light passing through the window portion and to transmit the light to the heat absorbing portion. The honeycomb panel has the reflective surfaces preferably arranged to taper downwardly into the heat absorbing portion so as to absorb the energy of the light during multiple bounces and to trap the air above the heat absorbing portion, thereby reducing convective heat losses.

In still other embodiments the top panel of the absorbing portion is provided with a plurality of parallel grooves which may, for example, have a V-cross-sectional shape. The longitudinal axis of such grooves is preferably oriented along the axis of solar travel over the panel for maximum receptivity and absorption of the incident light.

Many of the above described features of the invention may be utilized independently of some of the others, but they are preferably combined into one embodiment which is highly efficient in converting incident solar radiation into heat.

It is therefore an object of the present invention to provide a panel which is highly absorbing for incident light radiation having a wavelength in the range of 0.3 to 2 microns;

It is another object of the invention to provide a heat absorbing panel which has a low emissivity at radiation wavelengths corresponding to the temperature of the absorber when the emitted light wavelength equals 5 to 15 microns;

It is a further object of the invention to provide a high efficiency panel for converting incident light into heat wherein the panel is lightweight and sturdy; and It is a still further object of the invention to provide a high efficiency heat absorbing panel which has low heat losses due to radiation, convection and conduction.

The foregoing and other objectives, features and advantages of the invention will be more readily understood upon consideration of the following detailed description of certain preferred embodiments of the invention, taken in conjunction with the accompanying drawings.

DESCRIPTION OF THE DRAWINGS

FIGS. 3a and 3b are enlarged perspective views, with portions broken away and in section of the rib portions of the window panels depicted in FIGS. 2a and 2b;

FIG. 4 is an enlarged vertical view, in section, and with portions broken away of a window sheet of the embodiment of FIG. 1;

FIG. 5a is a perspective view of a modified window panel for the embodiment of FIG. 1 with portions broken away;

FIG. 5b is an enlarged vertical view, in section, of the structure depicted in FIG. 5a;

FIG. 5c is an enlarged vertical view, in section, of a modification of the structure depicted in FIG. 5b;

FIG. 5d is a perspective view of a second modified embodiment of the invention, with portions broken away and in section;

DETAILED DESCRIPTION OF CERTAIN PREFERRED EMBODIMENTS

Figure 1:
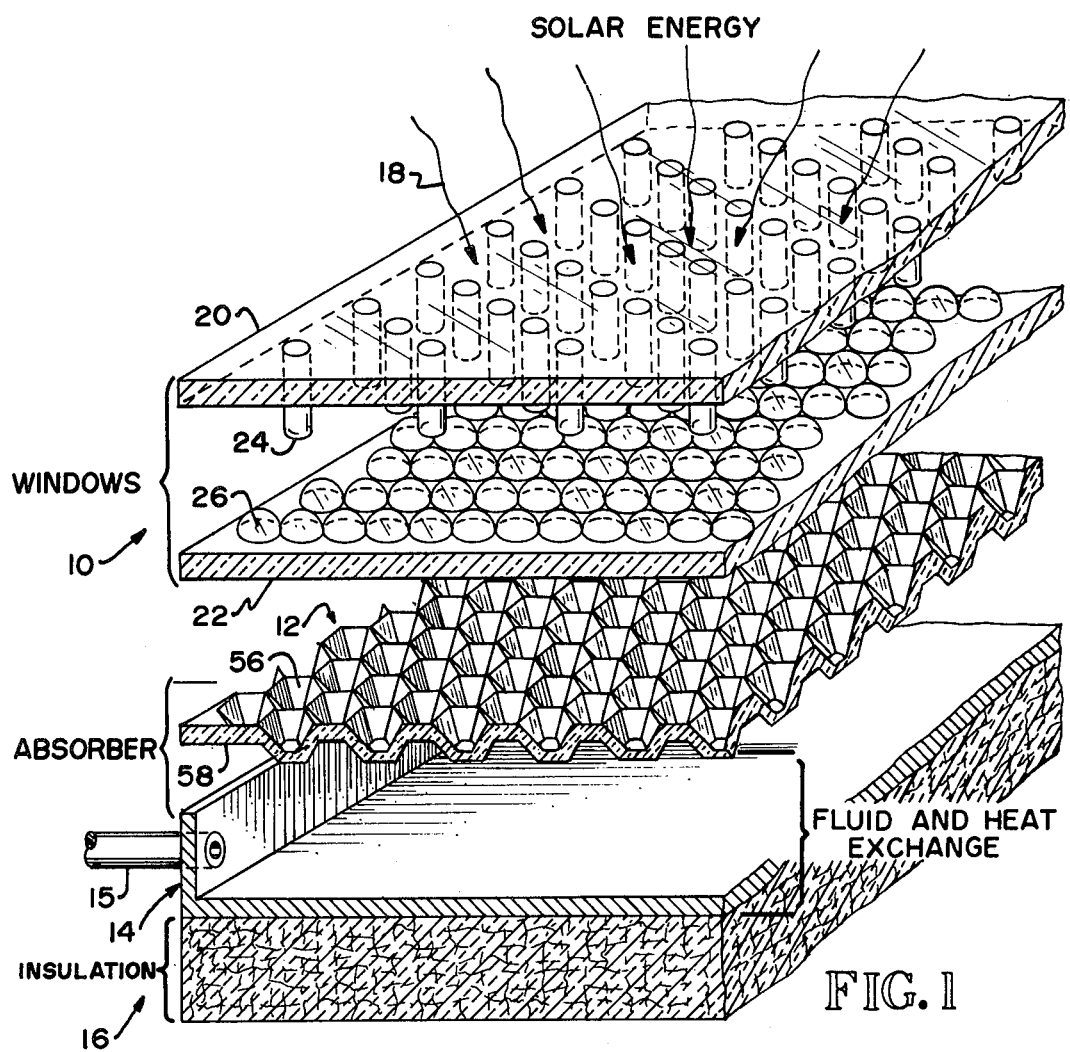
FIG. 1 is an exploded, perspective view, partly in section and with portions broken away of a solar panel according to a first embodiment of the invention.

Referring now more particularly to FIG. 1, the combined solar panel of the invention includes a window panel portion 10 and a heat absorbing portion 12. The heat absorbing portion 12 further includes a fluid heat exchanging chamber 14 and an insulating back 16 for the heat exchanger chamber 14. The heat exchanging fluid, such as water or air, is continuously admitted to the chamber 14 through an inlet pipe 15 and is exhausted from the chamber by an outlet pipe (not shown). In operation, incident solar radiation 18 passes through the window portion 10 to strike the heat absorbing portion 12. The heat generated in the heat absorbing portion 12 by the solar radiation 18 is transferred to fluid passing through the heat exchanging portion 14. This transfer of solar generated heat into the fluid raises its temperature.

As mentioned above, the window portion must be designed to accept solar radiation 18 over as wide an angle of incidence as possible. It also must be designed to prevent heat loss through reradiation from the heat absorbing portion 12 and heat loss due to convection currents above the heat absorbing portion 12.

The window panel 10 includes a pair of thin, transparent sheets 20 and 22 which are spaced apart by a plurality of upstanding columns or ribs 24 which are also made of lightweight, transparent material and preferably of a material which has high optical transmission qualities. In practice, the material chosen for the sheets 20 and 22 and the ribs 24 may be lightweight plastic. In other embodiment, the top sheet 20 may be glass for ruggedness.

Means are provided for segmenting the air space between the sheets 20 and 22 to reduce heat loss due to convection currents which would otherwise develop between the two sheets. In the embodiment depicted in FIG. 1, the means for segmenting the space comprises a plurality of transparent bubbles 26 on the upper surface of the sheet 22. The bubbles 26 may be made of a transparent material such as plastic. The bubbles 26 can be pressed flat against the flat sides 20 and 22 to reduce reflection losses at the spherical surface.

Figure 2A:
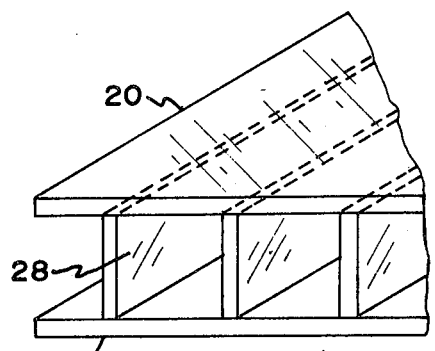
FIGS. 2a and 2b are enlarged perspective views, partly in section and with portions broken away of alternative window panels for the embodiment depicted in FIG. 1.
Figure 2B:
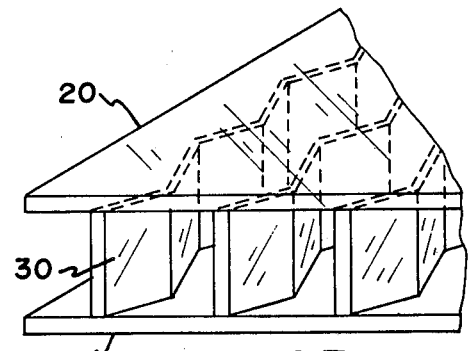

Referring now more particularly to FIGS. 2a and 2b, other types of columns and air space segmenting are depicted. In the embodiment of FIG. 2a the window sheets 20 and 22 are separated by a plurality of thin sheets 28 turned on edge to form a plurality of parallel ribs which extend the length of the sheets 20 and 22. In the modified embodiment depicted in FIG. 2b, the ribs are a plurality of sheets 30 turned on edge and bent in a zig-zag fashion. In the embodiments of FIGS. 1, 2a and 2b, the ribs 24, 28 and 30 are made of lightweight, optically transparent material. In still other embodiments (FIG. 7), the light transmitting structural support between the sheets may be a honeycomb or other shapes.

The purpose of having the ribs 23, 28 or 30, in addition to separating the sheets 20 and 22 to form an insulating air space, is also to provide means for transmitting incident light striking the top sheet 20 to and through the bottom sheet 22 so that the transmitted light will eventually strike the absorbing portion 12. By providing these ribs, the incident light is accepted over a wider incident angle than if the ribs were opaque and the only light reaching the absorbing portion was light which managed to penetrate both the top and bottom sheets 20 and 22. From Snell's law that $n_1 \sin\theta_1 = n_2 \sin\theta_2$ (where $\theta_1$ and $\theta_2$ are the incident angle and the refracted angle, respectively) and the principle of total internal reflection that the angle ($\theta_3$) for light leaving the material having the higher index ($n_2$) of refraction into a material (such as a coating) of a lower refractive index ($n_3$) must be 90° (see FIG. 3b):

$$\theta_{1_{max}} = \sin^{-1}\{(n_2)^2 - (n_3)^2\}^{\frac{1}{2}}$$

where $\theta_{1_{max}}$ = maximum light acceptance angle for total internal reflection $n_1$ = refractive index for air or $n_1 = 1$ $n_2$ = refractive index of material of rib 28, and $n_3$ = refractive index of a protective dielectric coating 29 on rib 28, where rib 28 is uncoated, $n_3 = 1$ and $\theta_{1_{max}} = \sin^{-1}\{(n_2)^2 - 1\}^{\frac{1}{2}}$ Note that $\theta$ is measured with respect to the normal of the top surface of the rib, and therefore the actual maximum acceptance angle in the above examples is $2\theta_1$. In the case of wall type ribs, such as ribs 28 and 30, there is some advantage in aligning their longitudinal axis with the direction of travel of the sun over the panel. When this is done the bulk of the incident light will always be within the acceptance angle since the acceptance angle for light controlled in all planes which contain the longitudinal axis is substantially 180°.

While the above described mathematical relationships between the angle of acceptance and the indices of refraction are given with respect to the rib 28, it should be apparent that substantially similar relationships apply to the ribs 24 and 30. Thus, light is transferred through the area of the window portion which is covered by the ribs by means of multiple, total internal reflections within the ribs 24, 28 or 30.

In some embodiments it is preferable to coat the sheets 20 and 22 with a transparent hard coating 32 in order to prevent scratching and an anti-reflection coating 34 to minimize reflection losses (see FIG. 4). Further, in some embodiments it is preferable to stack a number of window sections 10 to minimize heat losses due to convection and reradiation from the absorbing portion 12.

Referring now more particularly to FIGS. 5a and 5b, still another embodiment of the window section 10 is illustrated. In the embodiment of FIGS. 5a and 5b a panel of optical valves 36 are located beneath the sheets 20 and 22. The optical valves 36 have the effect of admitting incident light to the structure but blocking the escape of a large percentage of the reflected infrared radiation emitted by the absorbing portion 12. The basic structure of each optical valve in the panel 36 is to provide a plurality of opposed reflecting surfaces which converge in the overall direction of light travel from the window portion 10 to the heat absorbing portion 12. The reflecting surfaces of each optical valve of the panel 36 may be in the form of a plurality of reflecting V-grooves or in honeycomb cells but both arrangements have wider openings at the top surface, that is, the surface first struck by the incident solar radiation, than at the bottom surface, that is, the surface closest to the heat absorbing portion 12. The optical valve panel 36 may be composed of combinations of metal and/or dielectric materials.

In the embodiment depicted in FIGS. 5a and 5b, a plurality of downwardly converging V-grooves are formed by constructing the panel 36 of upwardly pointing, triangularly shaped wedges 38 of low refractive index material interspersed between downwardly pointing, truncated triangularly shaped wedges 40 of high refractive index material. The incident solar radiation is transmitted through the high refractive index medium 40 and is reflected at each interface formed between a wedge of high refractive index material 40 and a wedge of low refractive index material 38. Thus, these interfaces formed by the discontinuities in the refractive indices are effectively reflective surfaces 42 for the incident solar radiation. Such a reflecting surface 42 is formed on the opposite, downwardly converging sides of each wedge 40 and thus light entering the top of the wedge 40 is multiply reflected downwardly towards the heat absorbing portion 12 (not shown in FIG. 5b) which is below the optical valve panel 36.

In order to prevent the escape of infrared radiation emitted by the heat absorbing portion, a plurality of infrared reflecting surfaces 44 which face the heat absorbing portion 12 are provided on the bottom of each wedge 38. Therefore this optical valve panel 36 is highly transmitting for incident solar light and highly reflecting for the far infrared which is re-emitted by the heat absorbing portion 12.

Referring now more particularly to FIGS. 5c and 5d, metal or multiple dielectric layers are used for reflection in place of the wedges 38 and 40 of transparent material. In particular, in the embodiment of FIG. 5c a plurality of opposed reflecting surfaces 46 are embedded in a transparent medium 48. The opposed reflecting surfaces 46 are inclined to converge downwardly towards the heat absorbing portion 12. The infrared reflecting surfaces 44 are placed on the bottom of the panel of material 48 between pairs of opposed converging surfaces 46 in a manner similar to the embodiment of FIGS. 5a and 5b.

In the embodiment depicted in FIG. 5d, thin flat laminates 50 are attached together along one edge to form a downwardly opening V-shaped channel 52. A plurality of the V-shaped channels 52 are aligned parallel to each other and extend along the length of the solar panel. The opposed reflecting surfaces of each adjacent pair of reflecting channels 52 form a pair of downwardly converging reflecting surfaces as in the other optical valve embodiments described above with reference to FIGS. 5b and 5c. The bottom of each V-shaped channel 52 is open so that infrared radiation emitted from the heat absorbing portion 12 strikes the interior surfaces of the V-shaped channel 52 which face the heat absorbing portion 12 and is re-reflected back to the heat absorbing portion 12 by multiple reflections within the V-shaped channels 52 as indicated by the dashed line path in FIG. 5d. In other embodiments, the infrared reflecting surfaces may be flat, curved or even corner cubed and are not necessarily merely the backside of the laminates 50.

The reflective surfaces 46 and 50 may be polished metal or multiple layers of dielectric coatings over the channel surfaces to form a reflective laminate. One advantage of dielectric coatings over metal surfaces is that dielectric coatings can be made with a higher reflection coefficient than the metal surfaces alone but generally for smaller angles and wavelength ranges.

One important consideration in the design of these optical valves 36 is the acceptance angle for solar radiation. If the light striking the top of the panel 36 is at too large an angle with respect to the normal to the top of the panel 36, then the incident light will be returned out the top or retracted out of the panel rather than be passed through it by multiple reflections. In all planes containing the apex line of the V-groove, all incident angles of solar radiation are accepted. Thus, with reference to FIG. 5a, incident light striking the panel 36 in a plane which is normal to the panel 36 and which passes through the lower apex of any given wedge 40 will be accepted.

Figure 6A:
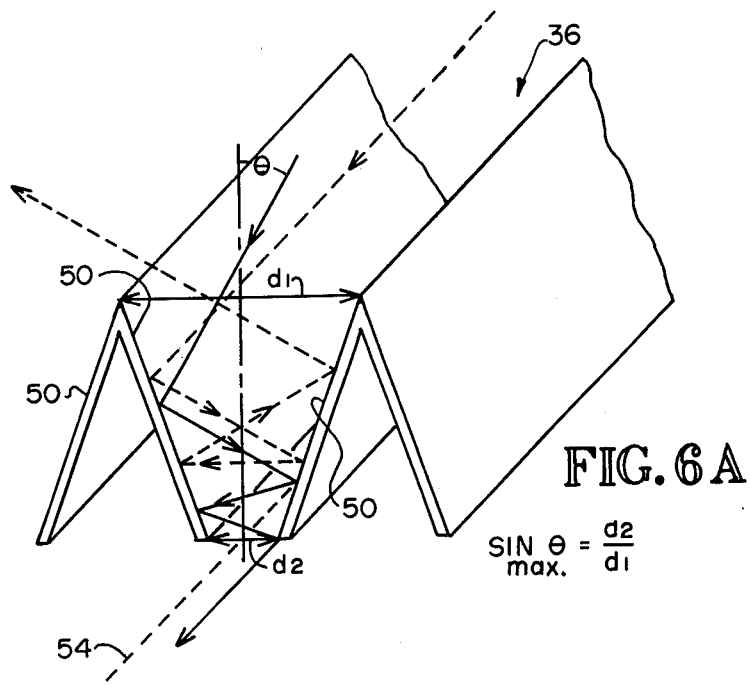
FIGS. 6a and 6b are diagrammatic illustrations for use in explaining the operation of the window panels depicted in FIGS. 5a - 5d.

Referring now more particularly to FIG. 6a, which is an enlarged and perspective view of the embodiment depicted in FIG. 5d, the apex line is defined as a line 54 which is centered between the opposed reflecting surfaces 50 at their closest points and parallel to the top surface of the panel 36. For light striking the top of the panel 36 in a plane which is normal to the apex line 54, it can be shown that the acceptance angle of the incident light is:

$$\theta_{max} = \sin^{-1}(d_2/d_1)$$

and the full acceptance angle, $2\theta_{max}$ (i.e. the light striking from either side of a line normal to the top of the panel 36) is:

$$2\theta_{max} = 2\sin^{-1} d_2/d_1$$

where $d_2$ is the width of the smaller end, and $d_1$ is the width of the larger end of the V-shaped groove formed by the opposed reflecting surfaces 50. For any larger angle the incident light will not be multiply reflected toward the apex but instead will be reflected upwardly of the V-groove.

Figure 6B:
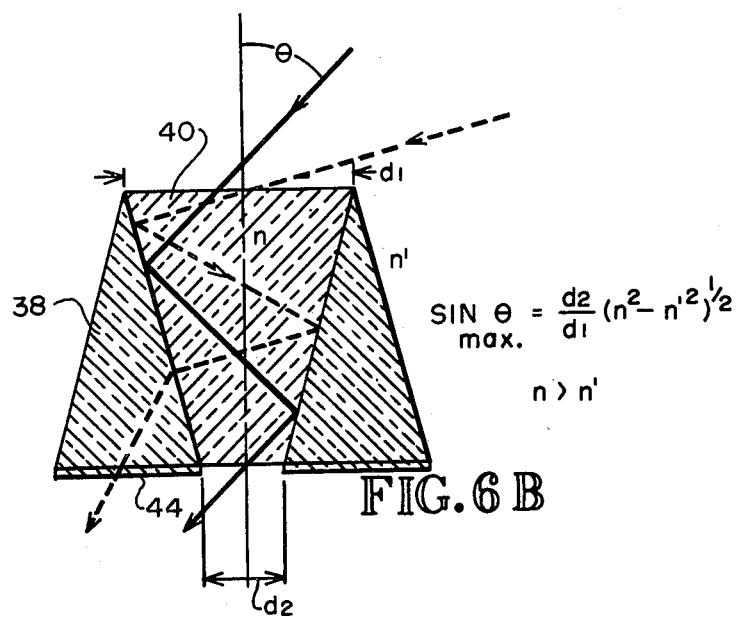

When the groove consists of two different dielectrics, as depicted in FIGS. 6b and 5b, for example, the full acceptance angle can be shown to be:

$$2\theta_{max} = 2\sin^{-1} d/2/d_1 (n^2 - n'^2)^{\frac{1}{2}}$$

where $n$ = refractive index of wedge 40, and $n'$ = refractive index of wedge 38. See *Fiber Optics*, pp. 18–21, by N. S. Kapany, the present applicant, (Academic Press, New York 1967).

While in the above described embodiments, the optical valve panel 36 is illustrated in the figures as comprising a plurality of V-grooves, in other embodiments (FIG. 7), as mentioned above, it has a honeycomb cell structure 60 wherein the opening closest to the incident light is wider than the opening which is closest to the absorbing portion 12. The opposed plane surfaces inside each honeycomb cell of the structure 60 provide a plurality of opposed reflecting surfaces which operate in substantially the same manner as the V-groove arrangements shown above so that a detailed description of the honeycomb arrangement will be omitted.

Figure 7:
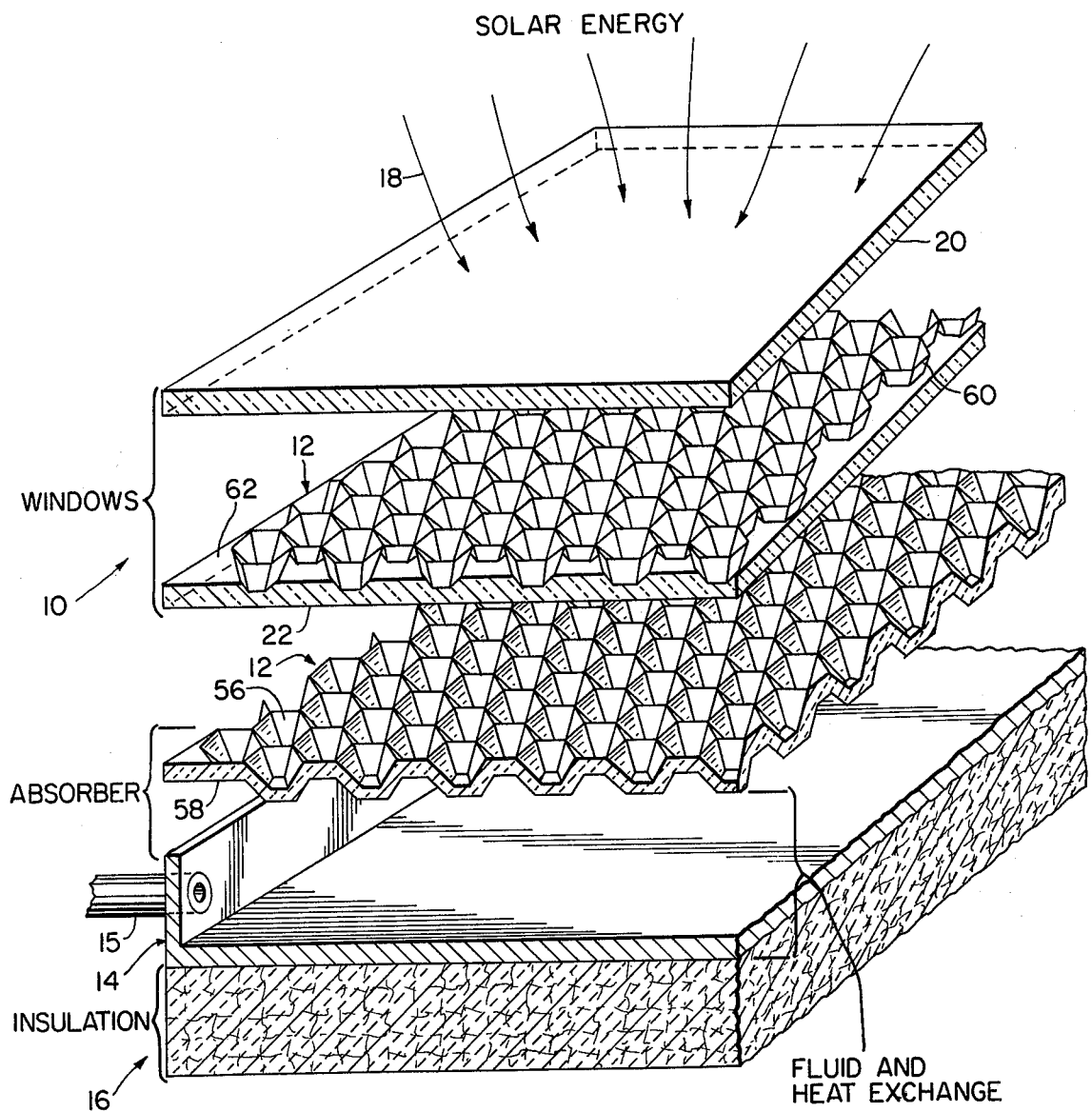
FIG. 7 is a perspective view of a third modified window panel for the embodiment of FIG. 1, with portions broken away.

The honeycomb structure 60 may be situated between the sheets 20 and 22 (as shown in FIG. 7) or it may be a separate panel below the sheet 22. The plane surface area 62 of the structure 60 below and between the honeycomb cells is preferably a reflecting surface for the infrared radiation emitted by the absorbing portion 12.

One advantage of this structure over the V-groove or wedge configurations is that it is non-axially directional. The V-groove or wedge structures of FIGS. 5a – 5d preferably are utilized with their longitudinal axes aligned with the sun's direction of travel over the panel so that the bulk of the incident light will always strike within the incident angle of acceptance. This is true because for light contained in a plane passing through their longitudinal axes the V-groove or wedge structures have an acceptance angle of nearly 180°. With the honeycomb structure 60, however, the sun's direction of travel is not material since light is accepted in the same manner for any given incident angle within the acceptance angle with respect to the normal to the panel for all radial directions about the panel.

Another advantage of the honeycomb cell structure 60 over some other designs is that it is very effective in segmenting the air space above the absorbing portion to reduce convective heat losses.

Referring again more particularly to FIG. 1, as mentioned above, the ideal absorber has a high absorptivity in the wavelength range of 0.3 to 2 microns and a low emissivity in the wavelength range of approximately 10 microns (the far infrared). In the embodiment depicted in FIG. 1, the absorbing portion 12 has a tapered honeycomb structure 56 embossed directly on the upper face of the top panel 58 of the heat exchanger 14. The embossed honeycomb structure 56 provides multiple bounce absorption of the incident light ray transmitted through the window portion 10. The multiple bounce absorption is substantially similar in operation to that described above with reference to the reflecting surfaces for the optical valve structure 36, that is, the incident light passing through the window 10 is reflected a multiple number of times within the hollows of the honeycomb structure 56 until it strikes the upper surface of the heat exchanger 14 where the incident light is converted into thermal energy.

The honeycomb structure 56 gives good contact between the heat exchanger 14 and the fluid to be heated and it is inexpensive to manufacture in large quantities. In other less advantageous embodiments, the honeycomb structure 56 is not tapered downwardly towards the heat exchanging portion 14 and has a substantially uniform cross section. The advantage of having a multiple bounce absorption structure is that it provides high absorption with low emissivity of infrared. This is because although a polished reflector has a low absorptivity, $\rho$, for a single bounce of the incident radiation, the fractional absorption for $n$ bounces is $(1 - \rho)^n$.

For example, if $\rho$ equals 0.8 and $n = 3$, approximately 99% of the incident energy is absorbed by the absorbing portion 12. In this manner a high ratio of absorptivity to emissivity can be obtained while still maintaining appreciable absorption. In addition, the honeycomb structure illustrated in FIG. 1 reduces convection losses because the air above the heat exchanging portion 14 is compartmentalized. Furthermore, the top of the honeycomb structure 56 can be covered with a light transmitting panel which may, for example, be the bottom sheet 22 of the window portion to enhance the compartmentalization of the air above the heat exchanging portion 14.

Figure 8:
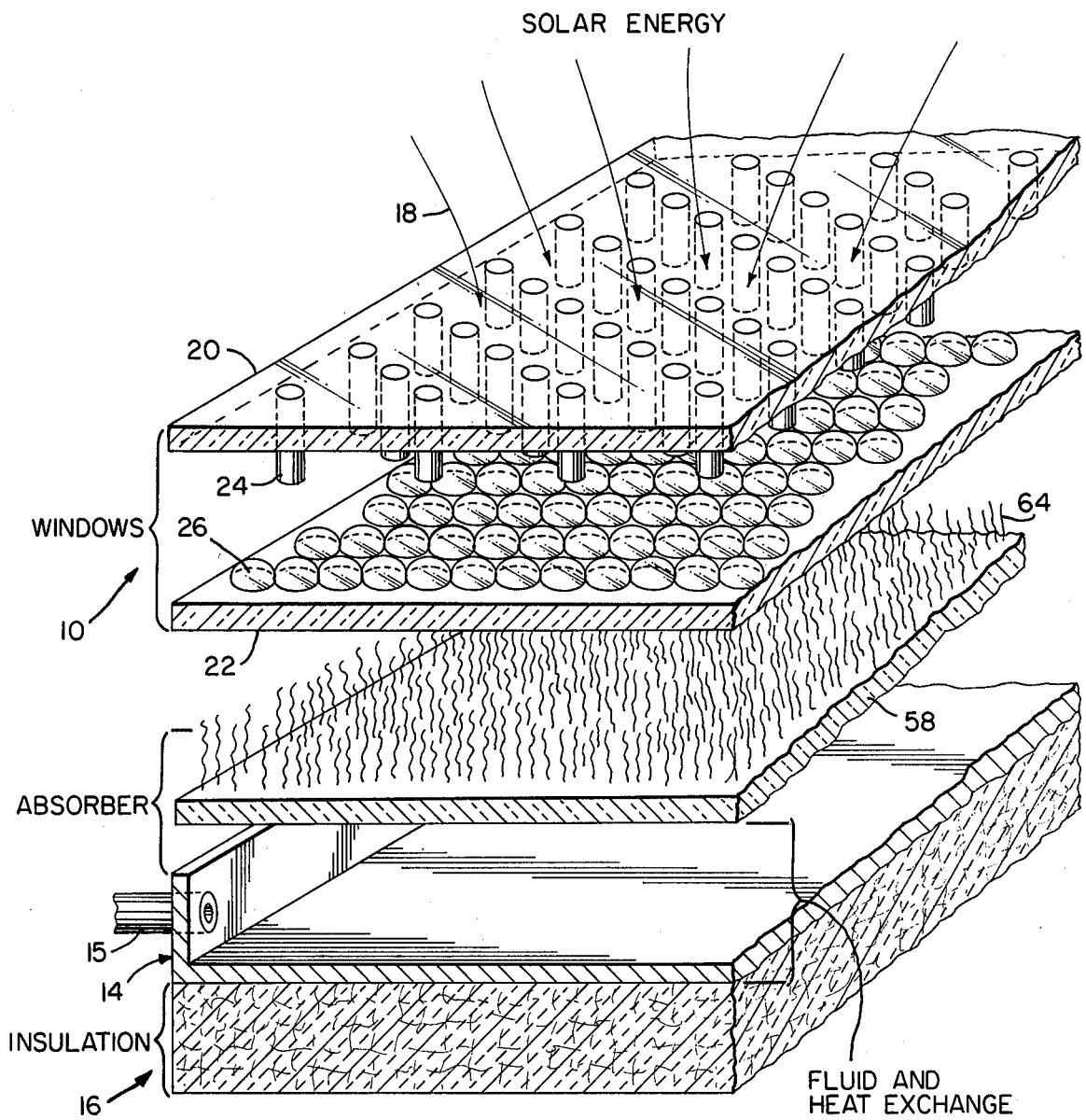
FIGS. 8 and 9 are perspective views partly in section and with portions broken away of alternative top panels for the absorbing portion.

In other embodiments, the top panel 58 of the absorber may have V-grooves similar to those shown for the optical valves 36, for example. In still another embodiment, referring more particularly to FIG. 8, the top panel 58 has a plurality of upstanding metallic fibers 64. These fibers 64 absorb the heat energy from the incident light and conduct it to the panel 58. They also reduce heat loss due to convection by trapping the air immediately above the panel 58. The fibers 64 are preferably coated to more effectively absorb the heat energy of the light while reducing the infrared emission.

Figure 9:
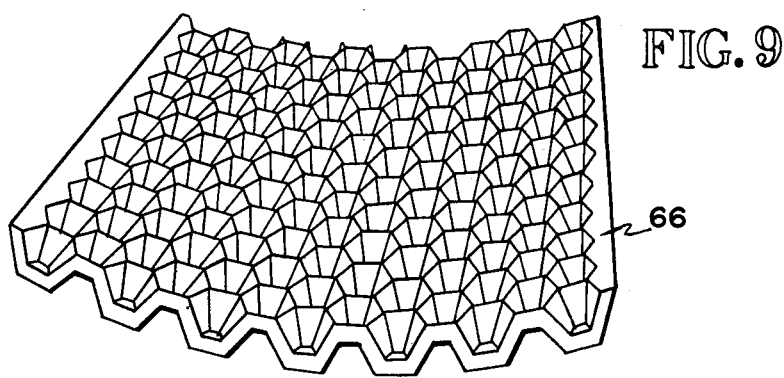

The panel embodiments have been described above as generally flat but in other embodiments they may be curved to give a concentrated effect. In such embodiments, either or both the window and heat absorbing portions 10 and 12, respectively, may be curved. Thus, for example, referring more particularly to FIG. 9, the honeycomb dimpled top panel 66 of the heat absorber 14 may have a curved cross section.

Although the insulation backing for the heat exchanger 14 is shown as being fiberglass in FIG. 1, in other embodiments the insulation may be composed of a multilayer structure of alternating sheets of reflective and dielectric material. In still other embodiments the insulating portions may be segmented plastic sheets of the type described above in reference to the window portion 10 with a reflecting surface below.

While the panel of the invention has been described above for use in converting solar radiation into heat, it should be apparent that it may also be used for converting incident radiation from other sources, both natural and man made, into heat.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. A panel for converting incident light into heat comprising a heat absorbing portion, which includes a heat exchanger, and a window portion interposed between the incident light and the heat absorbing portion, at least one of the heat absorbing and window portions having a plurality of light transparent members through which the incident light passes, the light transparent members each having a pair of opposed exterior surfaces which converge toward the heat exchanger, a light transparent medium surrounding the opposed exterior surfaces of the light transparent members, the light transparent medium having a lower index of refraction than the light transparent members, whereby the opposed exterior surfaces of the light transparent members constitute opposed reflecting surfaces which transmit at least a portion of the incident light by multiple, totally internal reflections toward the heat exchanger, and means interposed between these reflecting surfaces and the heat exchanger for reflecting infrared light emitted by the heat exchanger back to the heat exchanger.

2. An improved panel for converting incident light into heat, the panel being of the type which includes a heat absorbing portion having a heat exchanger and a window portion interposed between the incident light and the heat absorbing portion, at least one of the heat absorbing and window portions having a plurality of opposed reflecting surfaces which transmit the incident light by multiple reflections towards the heat exchanger, the improvement in the panel comprising a first set of a plurality of parallel, triangularly shaped, elongated wedges made of a light transmitting material, each wedge having three apexes with one apex pointing away from the heat exchanger and a second set of truncated, triangularly shaped wedges oriented in the opposite direction as the first set of wedges and interspersed between them, the second set of wedges being made of a light transmitting material having a higher refractive index than the material of the first set of wedges so that the interfaces between the wedges of the first and second set form the plurality of reflective surfaces and further including means interposed between the reflecting surfaces and the heat exchanger to reflect infrared light emitted by the heat exchanger back to the heat exchanger.

3. The panel as recited in claim 2 wherein the infrared reflecting means comprise infrared reflecting surfaces disposed between the other two apexes of each wedge of the first set for reflecting infrared light emitted by the heat exchanger back to the heat exchanger.

4. An improved panel for converting incident light into heat, the panel being of the type which includes a heat absorbing portion having a heat exchanger and a window portion interposed between the incident light and the heat absorbing portion, at least one of the heat absorbing and window portions having a plurality of opposed reflecting surfaces which transmit the incident light by multiple reflections toward the heat exchanger, the improvement in the panel comprising a first set of a plurality of parallel, triangularly shaped, elongated wedges made of a light transmitting material, each wedge having three apexes with one apex pointing away from the heat exchanger, and a second set of truncated, triangularly shaped wedges oriented in the opposite direction to the first set of wedges and interspersed between them, the second set of wedges being made of a light transmitting material having a refractive index higher than the material of the first set of wedges so that the interfaces between the wedges of the first and second set form a plurality of reflective surfaces which diverge from the one apex of the first set of wedges toward the heat exchanger.

5. A panel for converting incident light into heat comprising a heat absorbing portion and a window portion interposed between the incident light and the heat absorbing portion, the heat absorbing portion including a heat exchanger, a honeycomb cell structure having a plurality of opposed reflecting surfaces which transmit the incident light by multiple reflections toward the heat exchanger and further including means interposed between the reflective surfaces and the heat exchanger to reflect infrared light emitted by the heat exchanger back to the heat exchanger.

* * * * *